(12) United States Patent
Kishimoto et al.

(10) Patent No.: US 11,078,625 B2
(45) Date of Patent: Aug. 3, 2021

(54) WATER-DISPERSIBLE PAPER

(71) Applicant: NIPPON PAPER PAPYLIA CO., LTD., Shizuoka (JP)

(72) Inventors: Masaki Kishimoto, Tokyo (JP); Yoshiaki Ishino, Tokyo (JP)

(73) Assignee: NIPPON PAPER PAPYLIA CO., LTD., Shizuoka (JP)

( * ) Notice: Subject to any disclaimer, the term of this patent is extended or adjusted under 35 U.S.C. 154(b) by 0 days.

(21) Appl. No.: 16/499,566

(22) PCT Filed: Feb. 20, 2018

(86) PCT No.: PCT/JP2018/005936
§ 371 (c)(1),
(2) Date: Sep. 30, 2019

(87) PCT Pub. No.: WO2018/180011
PCT Pub. Date: Oct. 4, 2018

(65) Prior Publication Data
US 2020/0040530 A1   Feb. 6, 2020

(30) Foreign Application Priority Data
Mar. 30, 2017   (JP) .............................. JP2017-066934

(51) Int. Cl.
  *D21H 13/04*   (2006.01)
  *D21H 27/00*   (2006.01)
(52) U.S. Cl.
  CPC ........... *D21H 13/04* (2013.01); *D21H 27/005* (2013.01); *B32B 2307/7166* (2013.01)
(58) Field of Classification Search
  USPC ........................................................ 162/100
  See application file for complete search history.

(56) References Cited

U.S. PATENT DOCUMENTS

| | | | |
|---|---|---|---|
| 3,431,166 A | 3/1969 | Mizutani et al. | |
| 5,246,664 A * | 9/1993 | Nagata ................. | C09D 129/14 422/429 |
| 5,722,433 A | 3/1998 | Ishino et al. | |
| 2019/0270328 A1* | 9/2019 | Kishimoto ............... | B41M 5/41 |
| 2020/0095470 A1* | 3/2020 | Kishimoto ................. | C09J 7/21 |
| 2020/0308453 A1 | 10/2020 | Kishimoto et al. | |

FOREIGN PATENT DOCUMENTS

| | | |
|---|---|---|
| JP | 03-8897 A | 1/1991 |
| JP | 06-192991 A | 7/1994 |
| JP | 09-049198 A | 2/1997 |
| JP | 09-172929 A | 7/1997 |
| JP | 09-254122 A | 9/1997 |
| JP | 10-323818 A | 12/1998 |

OTHER PUBLICATIONS

English translation of the IPRP and Written Opinion corresponding to International Patent Application No. PCT/JP2018/005936 dated Oct. 10, 2019.
English translation of the International Search Report corresponding to International Patent Application No. PCT/JP2018/005936 dated May 15, 2019.
H'ng Paik San et al. "Anatomical Features, Fiber Morphological, Physical and Mechanical Properties of Three Years Old New Hybrid Paulownia: Green Paulownia," Res. J. For., vol. 10, pp. 30-35 (2016).

* cited by examiner

*Primary Examiner* — Mark Halpern
(74) *Attorney, Agent, or Firm* — Jenkins, Wilson, Taylor & Hunt, P.A.

(57) ABSTRACT

The present invention provides a water-dispersible paper having improved dispersibility in seawater. A water-dispersible paper can have excellent dispersion solubility in seawater and the clogging of a filter by a water-dispersible paper can be reduced, by using an alkalized carboxyalkyl cellulose having a specific degree of etherification (DS) and a specific Runkel ratio. The water-dispersible paper comprises a base paper containing fibrous carboxyalkyl cellulose and papermaking fibers, wherein the content of the fibrous carboxyalkyl cellulose in the base paper is from 25 to 80% by weight, the fibrous carboxyalkyl cellulose is alkalized, the degree of etherification (DS) of the fibrous carboxyalkyl cellulose is from 0.40 to 0.63, and Runkel ratio of the fibrous carboxyalkyl cellulose is from 0.5 to 3.5.

11 Claims, 1 Drawing Sheet

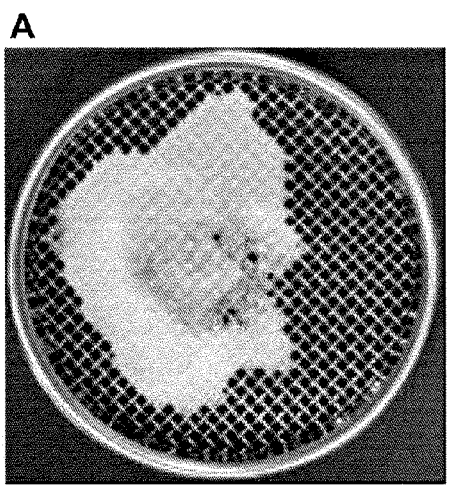 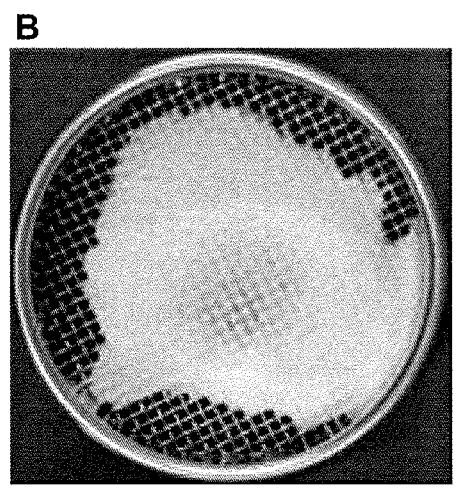

WATER-DISPERSIBLE PAPER

This application is a 371 of PCT/JP2018/005936 filed on 20 Feb. 2018

FIELD OF THE INVENTION

The present invention relates to a water-dispersible paper with excellent dispersibility in seawater.

BACKGROUND OF THE INVENTION

Water-dispersible paper (also referred to as Water-disintegrable paper or Water-soluble paper) which is rapidly dispersed in water or seawater is widely used for applications such as filter-wrapping paper of cigarettes, confidential document paper, fishing rod bait bags, etc. and alkalinized carboxyalkyl cellulose is used as the main component (References 1-4 etc.).
Reference 1: Japanese Patent Application Public Disclosure S40-968
Reference 2: Japanese Patent Application Public Disclosure H03-8897
Reference 3: Japanese Patent Application Public Disclosure H06-192991
Reference 4: Japanese Patent Application Public Disclosure H09-172929

Problems to be Solved by the Invention

The conventional water-dispersible paper using alkalized carboxyalkyl cellulose was obtained after examining its degree of etherification, the blending ratio of carboxyalkyl cellulose and wood pulp, etc. (References 1 to 4 etc.). However, when the conventional water-dispersible paper is dispersed in water or seawater, most of them are dispersed in the form of fiber or gel-like mass (hereinafter referred to as "residue"), although part of the carboxyalkyl cellulose dissolves in water, therefore, there is a problem that clogging of a water filter or poor dispersion/dissolution into seawater occurs caused by the residue (see Comparative Example 1 and FIG. 1B).

Therefore, the purpose of the present invention is to provide a water-dispersible paper having an improved dispersibility in seawater.

Means to Solve the Problems

As a result of intensive study of the above problems, the inventors have found that a water-dispersible paper with excellent dispersibility in seawater and less clogging with filters due to residue can be prepared by using an alkalized carboxyalkyl cellulose having a specific degree of etherification (DS) and a specific Runkel ratio, then completed the present invention.

That is, the present invention provides a water-dispersible paper comprising a base paper containing fibrous carboxyalkyl cellulose and papermaking fibers, wherein the content of the fibrous carboxyalkyl cellulose in the base paper is from 25 to 80% by weight, the fibrous carboxyalkyl cellulose is alkalized, the degree of etherification (DS) of the fibrous carboxyalkyl cellulose is from 0.40 to 0.63, and Runkel ratio of the fibrous carboxyalkyl cellulose is from 0.5 to 3.5.

BRIEF DESCRIPTION OF THE DRAWINGS

FIG. 1 shows the appearance of the residue on a mesh after pouring the seawater dispersion of a water-soluble sheet on a 10-mesh standard sieve. For the test conditions, refer to Dispersibility in seawater in the Examples. "A" shows of Example 1 and "B" shows the Comparative Example 1.

DETAILED DESCRIPTION OF THE INVENTION

The water-dispersible paper of the present invention comprises a paper base (hereinafter also referred to as "base paper") comprising fibrous carboxyalkyl cellulose and papermaking fibers.

The content of the fibrous carboxyalkyl cellulose in the base paper is 25 to 80% by weight, preferably 35 to 75% by weight.

The fibrous carboxyalkyl cellulose used in the present invention is obtained by carboxyalkylating natural cellulose fibers, regenerated cellulose fibers or purified cellulose fibers by a known method, and is water insoluble. Specific examples thereof include fibrous carboxymethyl cellulose and fibrous carboxyethyl cellulose and the like.

The degree of etherification (DS, degree of substitution of carboxyalkyl group) of the fibrous carboxyalkyl cellulose used in the present invention is 0.40 to 0.63, preferably 0.45 to 0.60.

The Runkel ratio of the raw material cellulose fiber of the fibrous carboxyalkyl cellulose used in the present invention is 0.5 to 3.5, preferably 0.8 to 3.2. The Runkel ratio is a value obtained by dividing the twice of the thickness of the fiber cell wall by the fiber lumen width.

In the present invention, the fibrous carboxyalkyl cellulose is alkalized by using an alkalizing agent. By alkalizing the base paper, the water-insoluble fibrous carboxyalkyl cellulose in the base paper is converted to a water-soluble fibrous carboxyalkyl cellulose salt by a neutralization reaction, then the fibers of the base paper tend to swell and break up in water and the base paper becomes water dispersible. The alkalizing agent is an aqueous solution of an alkaline compound, and the specific examples thereof include water solutions of alkali metal hydroxides such as sodium hydroxide and potassium hydroxide; carbonates and bicarbonates of alkali metals such as sodium carbonate and sodium bicarbonate; alkaline metal phosphate or hydrogen phosphate, such as sodium hydrogen phosphate; organic acid salts of alkali metals, such as sodium acetate; hydroxides of alkaline earth metals such as calcium hydroxide; ammonia and ammonium salts; amines such as ethanolamine; polyethyleneimine with a molecular weight of 1000 or less; and the like. Among these, hydroxides or salts of alkali metals are preferable as the alkaline compound.

The alkalization may be carried out by mixing the alkalizing agent into a stock solution during paper making of base paper, or, after paper making, by spraying the alkalizing agent by using a sprayer, coating by using a coating machine, or transferring the alkalizing agent to the paper stock by using a felt, etc. on which the alkalizing agent is applied, and the like. It can be carried out by any suitable method as appropriate.

When applying the alkalizing agent on the base paper using a coating machine, the alkalizing agent is applied using a coating machine as an aqueous solution of the above-mentioned alkaline compound or a mixture of the aqueous solution and an aqueous organic solvent compatible with the aqueous solution. The coating machine includes a well-known air knife coater, a bar coater, a roll coater, a blade coater, a curtain coater, a champlex coater, a gravure coater and the like.

In addition, a water-soluble polymer compatible with the aqueous solution may be blended in the aqueous solution of the alkaline compound in order to adjust the viscosity suitable for the coating machine or to prevent the alkaline compound from falling off after drying. The water-soluble polymer includes starch and starch derivatives, cellulose derivatives such as carboxyalkyl cellulose salts and hydroxyalkyl cellulose, alginates polyacrylates, and the like.

The coating amount of the alkaline compound is preferably at least the neutralization equivalent of the fibrous carboxyalkyl cellulose in the base paper, more preferably 1 to 3 times of the neutralization equivalent. When the amount of the alkaline compound is less than the neutralization equivalent, sufficient water dispersibility is difficult to obtain since the water-insoluble fibrous carboxyalkyl cellulose remains, and the solubility is reduced greatly since the carboxyalkyl celluloses are combined with each other over time. On the other hand, when the amount of the alkaline compound is more than three times of the neutralization equivalent, it is not preferable because the appearance and the quality deteriorates, such as discoloration and strength reduction, occurs due to the influence of the alkaline compound remaining in the substrate.

It is desirable to adjust the amount of the alkaline compound appropriately because the amount of the alkaline compound varies depending on the basic weight of the base paper, the degree of substitution and blending ratio of the fibrous carboxyalkyl cellulose, the type of the alkaline compound to be used, and the like. The amount of the alkaline compound is generally in the range of 0.2 to 70 parts by weight based on 100 parts by weight of the base paper. Furthermore, when the alkaline compound is sodium carbonate, the amount of the alkaline compound is preferably 0.3 to 67 parts by weight, more preferably 2.5 to 20 parts by weight based on 100 parts by weight of the base paper, and, when the alkaline compound is sodium hydroxide, the amount of the alkaline compound is preferably 0.2 to 51 parts by weight, more preferably 1.9 to 15 parts by weight based on 100 parts by weight of the base paper.

The papermaking fibers used in the present invention includes wood pulp fibers or non-wood pulp fibers commonly used for papermaking, for example, wood pulp fibers such as softwood Kraft pulp, hardwood Kraft pulp, dissolved pulp, mercerized pulp; non-wood pulp fibers such as flax pulp, Manila hemp pulp, Kenaf pulp; purified cellulose fibers such as lyocell, and the like.

The average fiber length of the water-dispersible papermaking fibers is 0.1 to 5 mm, preferably 0.5 to 3 mm, more preferably 0.8 to 2 mm.

The Canadian standard freeness of the papermaking fiber is 400 to 700 ml CSF, preferably 550 to 650 ml CSF. The Canadian standard freeness is measured according to Japanese Industrial Standard (JIS) P8121-2 2012 (the same shall apply hereinafter). As the beating proceeds (the freeness decreases), fibrillation, cutting and internal swelling of the fibers increase. Therefore, the water dispersibility decreases, while the density, strength and smoothness of the base paper increase.

The Runkel ratio of the papermaking fiber used in the present invention is not particularly limited, but is preferably 0.5 to 3.5, more preferably 0.8 to 3.2.

The water-dispersible paper of the present invention can be produced from a paper stock comprising fibrous carboxyalkyl cellulose and papermaking fibers by known papermaking technology. The paper machine used for paper making may be any of a cylinder paper machine, a inclined-wire paper machine, a Fourdrinier paper machine, a twin wire paper machine, etc., and suitable machine among these may be used in accordance with the required strength and water dispersibility. For example, in the case of using a cylinder paper machine, the strength anisotropy of the paper is large and the strength in the cross machine direction is weaker than that in the machine direction, thus base paper, which can be easily separate in the cross machine direction in water, can be manufactured.

Base paper can be manufactured as a single layer sheet, and also can be manufactured with making a plurality of wet paper web by a paper machine having two or more wires from the same paper stock to form a large basis weight. It is also possible to manufacture a laminated paper with a plurality of sheets of different paper stocks.

The basis weight of the base paper of the present invention is not particularly limited and may vary depending on the application, but is usually 10 to 200 $g/m^2$, preferably 30 to 160 $g/m^2$, more preferably 60 to 140 $g/m^2$.

An article with a specific shape can be formed by using the water-dispersible paper of the present invention. Then the shape of the article can be destroyed or the article can be removed, by immersing the article in seawater or washing out the article with seawater.

The water-dispersible paper of the present invention can be used for a gas sealing material for tungsten-inert gas welding, a packaging material for discarding in water, a water-soluble paper label and the like, but its application is not limited to these.

EXAMPLES

The following Examples illustrate the present invention, but the Examples are not intended to limit the scope of the present invention.

Example 1

A hand-made paper of a single layer sheet with basic weight of 110 $g/m^2$ was prepared using a papermaking material, which comprises 50% by weight of a hardwood bleached Kraft pulp (Runkel ratio is 0.99) beaten to Canadian freeness of 620 ml CSF and 50% by weight of a fibrous carboxymethyl cellulose (hereinafter referred to as "CMC") (Degree of etherification (DS) is 0.57, Runkel ratio of the raw material pulp is 2.60). Then a water-soluble sheet was prepared by applying an aqueous solution with 8.5% by weight of sodium carbonate on the hand-made paper by a size press method.

Example 2

A water-soluble sheet was prepared in the same manner as described in Example 1 except using a papermaking material, which comprises 50% by weight of the hardwood bleached Kraft pulp that is the same as that used in Example 1 and 50% by weight of a fibrous CMC (Degree of etherification (DS) is 0.57, Runkel ratio of the raw material pulp is 1.37).

Example 3

A water-soluble sheet was prepared in the same manner as described in Example 1 except using a papermaking material, which comprises 30% by weight of the hardwood bleached Kraft pulp that is the same as that used in Example 1 and 70% by weight of a fibrous CMC that is the same as that used in Example 1.

Example 4

A water-soluble sheet was prepared in the same manner as described in Example 1 except using a papermaking material, which comprises 70% by weight of the hardwood bleached Kraft pulp that is the same as that used in Example 1 and 30% by weight of a fibrous CMC that is the same as that used in Example 1.

Example 5

A water-soluble sheet was prepared in the same manner as described in Example 1 except using a papermaking material, which comprises 30% by weight of the hardwood bleached Kraft pulp that is the same as that used in Example 1 and 70% by weight of a fibrous CMC (Degree of etherification (DS) is 0.43, Runkel ratio of the raw material pulp is 3.30).

Comparative Example 1

A water-soluble sheet was prepared in the same manner as described in Example 1 except using a papermaking material, which comprises 50% by weight of the hardwood bleached Kraft pulp that is the same as that used in Example 1 and 50% by weight of a fibrous CMC (Degree of etherification (DS) is 0.57, Runkel ratio of the raw material pulp is 0.47).

Comparative Example 2

A water-soluble sheet was prepared in the same manner as described in Example 1 except using a papermaking material, which comprises 50% by weight of the hardwood bleached Kraft pulp that is the same as that used in Example 1 and 50% by weight of a fibrous CMC (Degree of etherification (DS) is 0.35, Runkel ratio of the raw material pulp is 2.57).

Comparative Example 3

A water-soluble sheet was prepared in the same manner as described in Example 1 except using a papermaking material, which comprises 50% by weight of the hardwood bleached Kraft pulp that is the same as that used in Example 1 and 50% by weight of a fibrous CMC (Degree of etherification (DS) is 0.65, Runkel ratio of the raw material pulp is 1.67).

Comparative Example 4

A water-soluble sheet was prepared in the same manner as described in Example 1 except using a papermaking material, which comprises 50% by weight of the hardwood bleached Kraft pulp that is the same as that used in Example 1 and 50% by weight of a fibrous CMC (Degree of etherification (DS) is 0.20, Runkel ratio of the raw material pulp is 2.90).

Comparative Example 5

A water-soluble sheet was prepared in the same manner as described in Example 1 except using a papermaking material, which comprises 10% by weight of the hardwood bleached Kraft pulp that is the same as that used in Example 1 and 90% by weight of a fibrous CMC that is the same as that used in Example 1.

Comparative Example 6

A water-soluble sheet was prepared in the same manner as described in Example 1 except using a papermaking material, which comprises 95% by weight of the hardwood bleached Kraft pulp that is the same as that used in Example 1 and 5% by weight of a fibrous CMC that is the same as that used in Example 1.

The water-soluble sheets obtained in the manners described above were evaluated as follows.

<Performance in Papermaking>

A hand-made sheet was prepared according to the method for making the standard hand-made paper specified in Japanese Industrial Standard (JIS) P8222. During the preparation, after forming a wet paper web on the wire from the papermaking material, the performance in transferring the wet paper web from the wire to the filter paper was evaluated.

Good: The transfer from the wire to the filter paper is possible.

Poor: The wet paper web sticks to the wire then the transfer from the wire to the filter paper is not possible.

<Dispersibility in Water> i) Dispersion Time

Five test pieces of 3 cm square were prepared from the sample which had been conditioned in an atmosphere of 23 degree C. and 50% RH for 24 hours or more. Then 300 ml of deionized water was placed in a 300 ml beaker, and one piece of the above test piece was put in the beaker while stirring at 650 rpm with a stirrer. The time required for the test piece to break to two or more pieces was measured with a stopwatch, and the average value of five measurements was taken as the dispersion time (seconds). The shorter the dispersion time, the better the dispersion. When the dispersion time is 20 seconds or less, the dispersion is excellent, and when the dispersion time is more than 20 seconds but 40 seconds or less, the dispersion is good, and when the dispersion time exceeds 60 seconds, the dispersion is poor. If the dispersion time is less than 40 seconds, there is no practical problem.

ii) Residue Amount on the Sieve

Test pieces with 500 mg of bone dry weight (absolute dry weight) were prepared from the sample which had been conditioned in an atmosphere of 23 degree C. and 50% RH for 24 hours or more. Then 300 ml of deionized water was placed in a 300 ml beaker, and the above test piece was put in the beaker while stirring at 650 rpm with a stirrer for 20 minutes to obtain a dispersion of the test piece. The obtained dispersion was poured on a 10-mesh standard sieve at 15 ml/s. The bone dry weight of the residue on the standard sieve was measured and was taken as the amount of residue (mg).

<Dispersibility in Seawater>

Simulated seawater (containing 2.71% by solid weight of sodium chloride, 3.81% by solid weight of magnesium chloride, 1.66% by solid weight of magnesium sulfate, 1.26% by solid weight of calcium sulfate) was prepared.

Then the same evaluation was conducted as in above "Dispersibility in water" by replacing the deionized water with the simulated seawater. Further, the bone dry weight of the residue was determined by excluding the seawater component on the standard sieve, which was taken as the amount of residue (mg), since the component of simulated seawater was contained in the residue on the sieve. FIG. 1 shows the residuals of Example 1 and Comparative Example 1.

The evaluation results are shown in Table 1. The amounts of the components in the table are represented by "weight %".

TABLE 1

| | Wood pulp | | CMC | | | Performance in papermaking | Dispersibility | | | |
|---|---|---|---|---|---|---|---|---|---|---|
| | | | | | | | in Water | | in Seawater | |
| | Amount | Runkel ratio | Amount | Runkel ratio | DS | | Dispersion time (sec) | Residue (mg) | Dispersion time (sec) | Residue (mg) |
| Example1 | 50 | 0.99 | 50 | 2.60 | 0.57 | Good | 2 | 5 | 11 | 64 |
| Example2 | 50 | 0.99 | 50 | 1.37 | 0.57 | Good | 2 | 5 | 11 | 65 |
| Example3 | 30 | 0.99 | 70 | 2.60 | 0.57 | Good | 2 | 5 | 4 | 12 |
| Example4 | 70 | 0.99 | 30 | 2.60 | 0.57 | Good | 3 | 10 | 17 | 162 |
| Example5 | 30 | 0.99 | 70 | 3.30 | 0.43 | Good | 2 | 19 | 9 | 146 |
| Comparative Example1 | 50 | 0.99 | 50 | 0.47 | 0.57 | Good | 4 | 9 | 30 | 245 |
| Comparative Example2 | 50 | 0.99 | 50 | 1.67 | 0.65 | Poor | 2 | 2 | 9 | 30 |
| Comparative Example3 | 50 | 0.99 | 50 | 2.57 | 0.35 | Good | 4 | 81 | 42 | 305 |
| Comparative Example4 | 50 | 0.99 | 50 | 2.90 | 0.20 | Good | 7 | 210 | 63 | 360 |
| Comparative Example5 | 10 | 0.99 | 90 | 2.60 | 0.57 | Poor | 3 | 4 | 4 | 11 |
| Comparative Example6 | 95 | 0.99 | 5 | 2.60 | 0.57 | Good | 10 | 240 | 90 | 420 |

What is claimed is:

1. A water-dispersible paper comprising a base paper containing fibrous carboxyalkyl cellulose and papermaking fibers, wherein the content of the fibrous carboxyalkyl cellulose in the base paper is from 25 to 80% by weight, the fibrous carboxyalkyl cellulose is alkalized, the degree of etherification (DS) of the fibrous carboxyalkyl cellulose is from 0.40 to 0.63, and Runkel ratio of the fibrous carboxyalkyl cellulose is from 0.8 to 3.5.

2. The water-dispersible paper of claim 1, wherein the degree of etherification (DS) of the fibrous carboxyalkyl cellulose is from 0.45 to 0.60.

3. The water-dispersible paper of claim 2, wherein the fibrous carboxyalkyl cellulose is fibrous carboxymethyl cellulose.

4. The water-dispersible paper of claim 2, wherein the alkaline compound used for the alkalization is a hydroxide of an alkali metal or a salt of an alkali metal.

5. The water-dispersible paper of claim 1, wherein the fibrous carboxyalkyl cellulose is fibrous carboxymethyl cellulose.

6. The water-dispersible paper of claim 5, wherein the alkaline compound used for the alkalization is a hydroxide of an alkali metal or a salt of an alkali metal.

7. The water-dispersible paper of claim 1, wherein the alkaline compound used for the alkalization is a hydroxide of an alkali metal or a salt of an alkali metal.

8. A method for destroying the shape of an article or removing the article, comprising a step of immersing the article in seawater or washing the article away with seawater, wherein the article has a specific shape and is formed by using the water-dispersible paper of claim 1.

9. A method for destroying the shape of an article or removing the article, comprising a step of immersing the article in seawater or washing the article away with seawater, wherein the article has a specific shape and is formed by using the water-dispersible paper of claim 2.

10. A method for destroying the shape of an article or removing the article, comprising a step of immersing the article in seawater or washing the article away with seawater, wherein the article has a specific shape and is formed by using the water-dispersible paper of claim 5.

11. A method for destroying the shape of an article or removing the article, comprising a step of immersing the article in seawater or washing the article away with seawater, wherein the article has a specific shape and is formed by using the water-dispersible paper of claim 7.

* * * * *